United States Patent Office 3,772,420
Patented Nov. 13, 1973

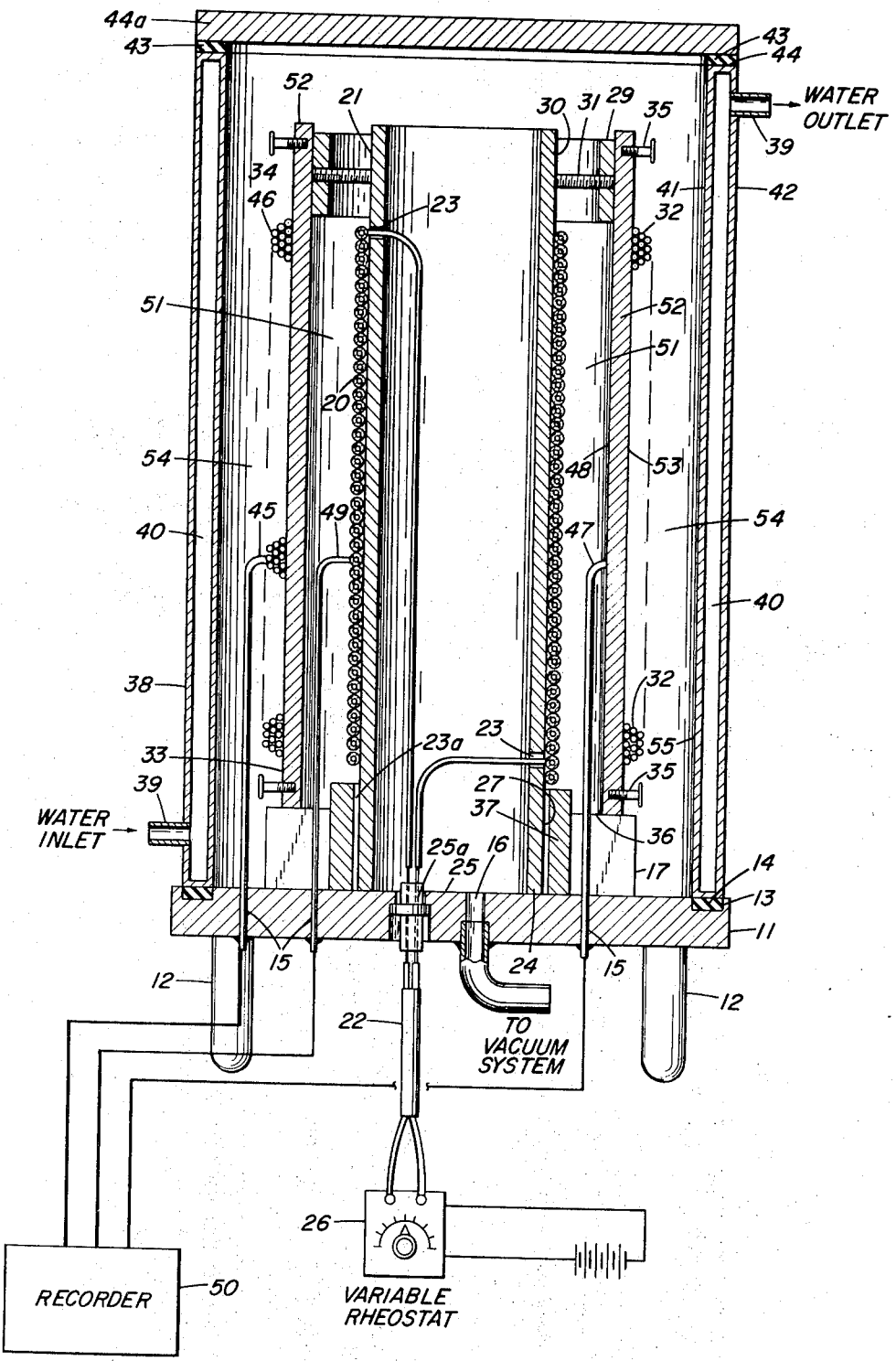

3,772,420
METHOD FOR IMPROVING THE IN-VIVO STRENGTH OF POLYGLYCOLIC ACID
Arthur Glick, Danbury, and James B. McPherson, Jr., Cos Cob, Conn., assignors to American Cyanamid Company, Stamford, Conn.
Original application Dec. 23, 1968, Ser. No. 786,049, now Patent No. 3,626,948. Divided and this application Sept. 7, 1971, Ser. No. 178,499
Int. Cl. B29c 25/00
U.S. Cl. 264—102                                  4 Claims

ABSTRACT OF THE DISCLOSURE

Polyglycolic acid in shaped form (i.e. a suture) which is substantially free from vaporizable impurities is provided which has significantly greater in-vivo strength retention than shaped polyglycolic acid containing said vaporizable impurities. The improved polyglycolic acid is prepared by vacuum heating shaped polyglycolic acid containing vaporizable impurities to vaporize the impurities therefrom, and then removing the vaporized impurities from the polyglycolic acid. An apparatus for conveniently carrying out the above process is also provided.

---

This is a division of application Ser. No. 786,049, filed Dec. 23, 1968, now U.S. Pat. 3,626,948.

BACKGROUND OF THE INVENTION

For many years, virtually all absorbable sutures used in animal and human surgery were prepared from mammalian intestine, such sutures being commonly called catgut sutures.

More recently, widespread research efforts have been directed toward discovery of a synthetic material which could be readily extruded into filaments from which sutures could be fabricated which would (1) retain their tensile strength after implantation in the body for a sufficient time to permit wounds joined together with such sutures to heal properly and (2) would be absorbed by the body without adverse effects and within an acceptable time after implantation. Such a material would have many advantages over catgut such as uniformity of composition, and, hopefully, ease of manufacture. These efforts have recently borne fruit. U.S. Pat. 3,297,033, for example, describes a synthetic absorbable suture prepared from polyglycolic acid, said patent herein incorporated by reference.

Polyglycolic acid can be prepared in a variety of ways. For example, it can be prepared by heating glycolic acid and then removing water and glycolide from the resulting material after which a catalyst is added to the residue and the residue heated (U.S. Pat. 2,585,427). It can also be prepared as described above except that the residue is cooled and collected as a powder which is then heated at an elevated temperature (U.S. Pat. 2,676,945). It can additionally be prepared by the polymerization of glycolide which is free from water and acid impurities in the presence of a catalyst (U.S. Pat. 2,668,162).

In order to obtain the strong filaments of polyglycolic acid which are suitable for use as absorbable sutures, it is necessary that the polyglycolic acid used to prepare the filaments have a relatively high molecular weight (i.e. in the range of 10,000 or more). It is now established that if polyglycolic acid of sufficiently high molecular weight for use as a suture is desired, the preferred route to such a polymer is by the polymerization of glycolide as described above. During the polymerization, some glycolide monomer fails to polymerize to polyglycolic acid and glycolide contents in the polymer of as much as about 8% have been observed.

Although entirely acceptable sutures can be prepared from polyglycolic acid containing glycolide, applicants have discovered that:

(1) when glycolide and other impurities which either react with the glycolide or are formed as by-products of a reaction of glycolide with a reactive impurity are removed from the polyglycolic acid to the extent possible by vaporization of the impurities, and (2) these vaporized impurities are then removed from the environment of the suture, that sutures prepared from such "substantially" impurity-free polymer exhibit an astonishing enhancement in in-vivo strength retention as compared to sutures prepared from polymer which contains these impurities. In-vivo strength retention is determined by implanting suture lengths in rabbits and then sacrificing the rabbits at prescribed intervals (usually 7 and/or 15 days after the implantation), whereupon the suture is removed and the tensile strength of the suture measured in accordance with standardized procedures.

With the advent of an absorbable polyglycolic acid suture, some attempts have been made to raise the in-vivo strength retention to previously unattainable values while at the same time assuring absorption of the suture by living tissue within a reasonable time. Ordinarily, it is desirable that an absorbable suture retain a surgically useful tensile strength for up to 10 to 15 days after implantation; it is equally important that the suture be absorbed by tissue soon thereafter, preferably within 90 days after implantation. It would, of course, be most desirable if a suture could be provided which gave consistently high in-vivo tensile strength even after 15 days implantation in tissue while simultaneously being substantially absorbed by the tissue within about 90 days after implantation. Achievement of these dual requirements in catgut absorbable sutures can present problems because treatments which enhance in-vivo strength retention of the suture may extend the absorption period appreciably. For example, when catgut sutures are chromicized to enhance in-vivo strength retention, conditions must be very carefully controlled to prevent excess chromicizing; otherwise, suture absorption times can be unduly prolonged.

U.S. Pat. No. 3,422,181 issued Jan. 14, 1969 teaches that in-vivo strength retention can be improved in a polyglycolic acid suture by merely heating the suture at certain temperatures and atmospheric pressure for a given period of time. However, the improved strength of the suture results primarily from an annealing effect within the polyglycolic acid filaments since, under the conditions described in the application, an effective amount of impurities would not be removed from the polymer if they were present therein. Also the application does not teach the importance of removing any volatilized impurities from the environment of the suture as will be discussed hereinbelow in greater detail. This is not surprising since, as mentioned above, little, if any, effective volatilization of impurities occurs under the process conditions of this application.

It is an object of this invention, therefore, to provide a new kind of shaped polyglycolic acid which is substantially free from vaporizable impurities and which, as a result thereof, exhibits consistently high in-vivo tensile strength even after 15 days implantation in living tissue.

It is another object to provide shaped polyglycolic acid having consistently high in-vivo strength retention after 15 days while, at the same time, being substantially absorbed by living tissue within 90 days after implantation.

It is also an object of this invention to provide a novel process and apparatus which are eminently suitable for preparing the polyglycolic acid of this invention.

SUMMARY OF THE INVENTION

This invention relates to polyglycolic acid in shaped form which is substantially free from vaporizable impurities.

The term "polyglycolic acid" or "polyglycolic acid in shaped form" as used herein refers to any of the continuous forms into which polyglycolic acid can be fabricated such as by extrusion, molding or such and includes monofilaments, multifilaments, sheets, film, rod, ribbons, and molded objects; it also includes polyfilamentary braided strands useful as absorbable sutures and variously shaped body implants and prosthetic devices such as described in copending application Ser. No. 608,068, filed Jan. 9, 1967, now U.S. Patent 3,463,158. The invention will be described in terms of a polyglycolic acid multifilamentary braid suitable for use as an absorbable suture for purposes of clarity; however, the invention is also applicable to various other shaped forms of polyglycolic acid as described above.

A "vaporizable impurity" is one which can be volatilized from the polyglycolic acid.

Polyglycolic acid is "substantially free from vaporizable impurities" when it exhibits a weight loss of less than 0.4% by weight when it is heated for three hours at 135° C. under an absolute pressure of 4 mm. of mercury in the presence of a cooled surface maintained at a temperature of about 25° C., said surface being separated from the polymer by a distance of about 2 inches. As the polyglycolic acid is heated, the vaporizable impurities contained therein are vaporized and diffuse across the gap between the polymer and the cooled surface. As the impurities strike the cooled surface they condense to produce a residue on the surface whereby the impurities are removed from the environment of the polyglycolic acid.

As described heretofore, the removal of these impurities has a pronounced effect upon the in-vivo strength retention of a shaped form of polyglycolic acid such as a suture. The impurities removed are believed to consist primarily of water, glycolide, and the linear dimer of glycolic acid which is represented by the formula:

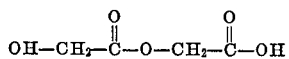

These impurities can arise in the polyglycolic acid in a variety of ways. For example, as described heretofore, glycolide can originate from unpolymerized monomer. If a polyglycolic acid suture containing glycolide is exposed to a moist environment the suture may pick up water. It is believed that this water reacts readily with the glycolide to cleave the glycolide ring and form the aforementioned linear dimer of glycolic acid. It is further believed that the linear dimer of glycolic acid can then react with the high molecular weight polyglycolic acid in a transesterification reaction to produce sutures having polyglycolic acid chains of lower molecular weight which tend, when implanted in living tissue, to give reduced retention of in-vivo tensile strength.

The impurities may also arise if the polymer is subjected to high temperatures which tend to partially degrade it. For example, polyglycolic acid is extruded at a temperature of about 240–250° C. and it is possible under these conditions that some polymer can degrade into glycolide or the linear dimer of glycolic acid. Of course, the glycolide thus formed can react with any moisture present to form additional undesirable linear dimer. Because of the reactive interrelation between water and glycolide to produce the undesirable linear dimer, it is essential that all three of these impurities i.e. water, glycolide, and the linear dimer of glycolic acid be removed. The degree to which the in-vivo strength retention is enhanced is believed to depend upon the extent to which the vaporizable impurities present are removed from the polymer. Ordinarily, as a greater proportion of these impurities is removed, a greater enhancement of in-vivo strength retention is noted.

This invention also relates to a process for preparing polyglycolic acid in shaped form which is substantially free from vaporizable impurities which comprises heating shaped polyglycolic acid containing vaporizable impurities in a dry environment at a temperature of from about 75° C. to about 160° C. at a sub-atmospheric pressure. Under these conditions an effective amount of vaporizable impurities contained in the polyglycolic acid is removed therefrom. Once these impurities are removed, it is essential to further remove them from the immediate environment of the heated polyglycolic acid. If this is not done, the impurities have a strong tendency, especially when pressures which are not sub-atmospheric are restored, to condense upon the surface of the polymer to product a white powdery surface coating on the polymer. These impurities also tend to polymerize to harmful higher molecular weight forms and cannot be removed from the polymer thereby causing an irretrievable loss of the polymer.

In cases where this deposition of impurities on the surface of the polyglycolic acid has occurred, the in-vivo as well as package properties of the polymer were most unsatisfactory indicating the highly undesirable effect these impurities can produce. Therefore, means must be provided, once these impurities have been vaporized, for removing them from proximity with the polyglycolic acid. A particularly suitable way for effecting this removal is to provide a cooled surface adjacent to the heated polymer, the cooled surface being maintained at a temperature below that of the heated polymer. After the vaporized impurities are removed from the polymer, they diffuse towards the cooling surface and condense thereon whereby they are removed from the environment of the polymer.

This invention also relates to an apparatus for removing and collecting vaporizable impurities from polyglycolic acid in shaped form. In its most basic aspects, the shaped polyglycolic acid member is supported in an airtight chamber. Means are provided for applying heat to the member within the chamber. Means are also provided for the creation of sub-atmospheric pressures within the chamber. The housing containing the chamber is adapted to provide for cooling at least a portion of the wall of said chamber adjacent to the heated member, this portion of the chamber wall being separated from the heated member by a predetermined distance. As the member is heated within the chamber under sub-atmospheric pressure, vaporizable impurities contained therein are vaporized and diffuse across the gap separating the heated member from the cooled portion of the chamber wall. As the impurities strike the cooled portion of the chamber wall they condense thereon to effect removal of the impurities from the environment of the polyglycolic acid member.

BRIEF DESCRIPTION OF DRAWINGS

FIG. 7 is a center sectional view of the assembled apparatus for FIG. 6 further including various equipment for controlling process conditions within the apparatus.

DESCRIPTION OF THE PREFERRED EMBODIMENTS

Polyglycolic acid as typically prepared in U.S. Pat. 2,668,162, or 3,297,033, is conventionally extruded into a multifilament which is then divided into various portions for use as sleeves and cores during braiding. A braided polyglycolic acid suture is prepared from these portions using conventional braiding techniques and equipment. A portion of the braid thus prepared is weighed and then wound circumferentially around a hollow metal cylinder. The cylinder-braid unit is weighed and placed within an Erlenmeyer flask with the axis of the cylinder perpendicular to the bottom surface of the flask. The flask is immersed in an oil bath maintained at a temperature about 5° C. higher than that at which it is desired to heat the braid. The upper portion of the flask is not immersed in the oil and is exposed to a room temperature environment. The appropriate sub-atmospheric pressure is then established in the flask. The impurities contained in the braid vaporize and diffuse to the inner surfaces of the flask which are not below the oil line, these surfaces having a temperature substantially below that of the heated braid. The impurities collect on these surfaces as a noticeable white powdery residue. After heating for the prescribed amount of time, the cylinder-braid unit is removed from the flask and weighed; this weight is subtracted from the original weight of the cylinder-braid unit to determine the quantity of impurities removed from the braid. The percent weight loss of the braid is determined by dividing the quantity of impurities removed by the original weight of the braid and multiplying by 100. The package properties, i.e. straight pull and knot pull, are measured on both unsterilized braid and braid sterilized by gaseous ethylene oxide. There is ordinarily no detectable difference in package properties between sterilized and unsterilized braid. Sterilized braid is then implanted in rabbits for a period of 7 or 15 days, after which the braid is removed from the animal and its tensile strength measured, said value being the in-vivo tensile strength. The straight pull is readily measured using a Scott inclined plane tester (Model Number IP–4) in accord with the method shown in U.S. Pat. XV, pg. 938. Knot pull is similarly measured in accord with the procedure shown in U.S. Pat. XV, pg. 939.

The method described immediately hereinabove was used to gather the data in Tables I to V hereinbelow.

PROCESS CONDITIONS

(a) Temperature

Figure 1:
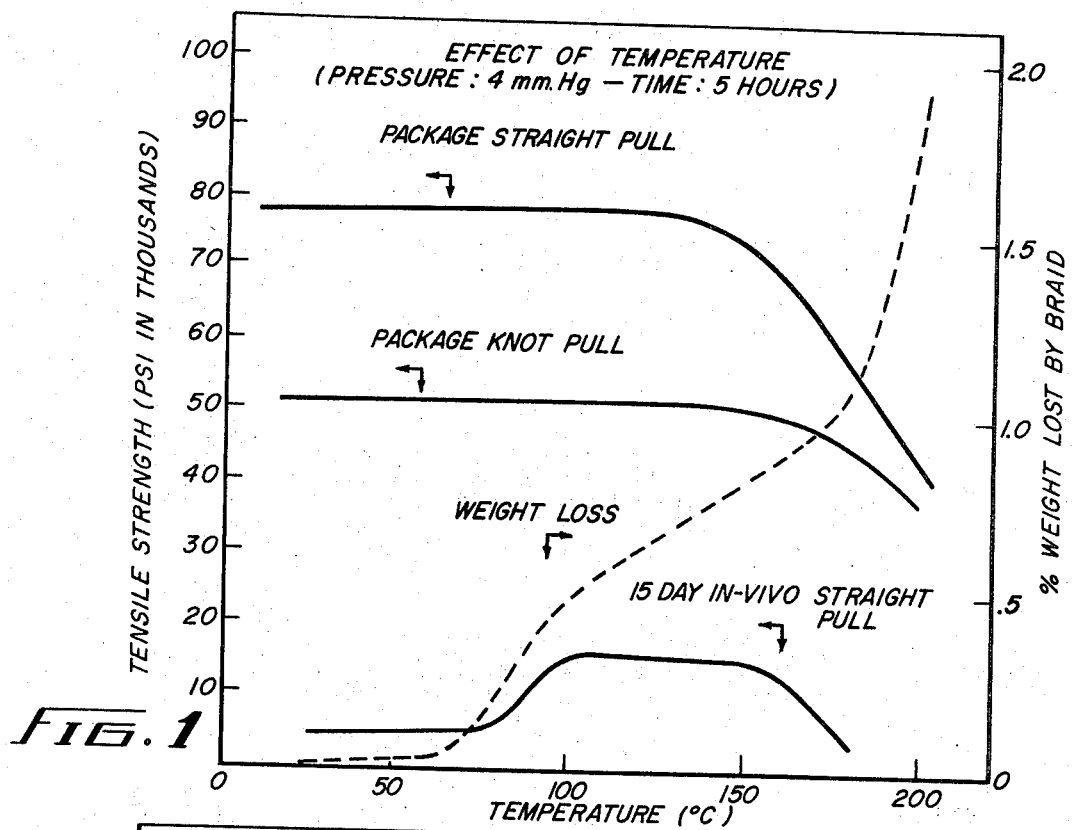
FIG. 1 depicts the effect of the temperature at which a polyfilamentary braid is heated upon various properties of the braid and upon the weight loss exhibited by the braid.

The effect of temperature (at constant pressure and heating time) upon package and in-vivo properties and upon the weight loss of sutures treated in accordance with the process of this invention is shown by the data of Table I. These data are graphically presented in FIG. 1. Referring to FIG. 1, it is observed that no appreciable weight loss occurs until the filament is heated to at least a temperature of 75° C. As soon as appreciable amounts of impurities begin to vaporize from the filament, there is a noticeable enhancement in the 15 day in-vivo straight pull value of the suture. This improvement continues until temperatures in excess of about 160° C. are employed whereupon there is a sharp decrease in in-vivo strength as well as package straight pull and knot pull. It should be noted that weight loss of the suture increases at a fairly constant rate as temperature increases until a temperature of about 160 to 180° C. is reached whereupon a sharp and dramatic increase in the amount of volatiles released by the suture occurs suggesting that at these elevated temperatures rapid thermal degradation of the polymer is beginning to occur. Preferred heating temperatures are from about 100° C. to 150° C. The data of Table I indicate that in-vivo strength retention can be improved by as much as 222% when the suture is treated within the preferred temperature range given above.

TABLE I.—THE EFFECT OF TEMPERATURE (4 mm. Hg. for 5 hours)

| Temperature (° C.) | Percent wt. loss | Package properties | | | | | 15-day in-vivo properties | | | | |
|---|---|---|---|---|---|---|---|---|---|---|---|
| | | Dia. (mils) | Straight pull | | Knot pull | | Dia. (mils) | Lb. | Straight pull | | |
| | | | Lb. | P.s.i. | Lb. | P.s.i. | | | P.s.i. | Percent increase in lb. | Percent increase in p.s.i. |
| Control | | 13.4 | 10.8 | 76,600 | 7.3 | 51,800 | 13.8 | .74 | 4,900 | | |
| 90 | .413 | 13.7 | 11.7 | 79,400 | 7.6 | 51,600 | | | | | |
| 103 | .510 | 13.4 | 11.2 | 79,400 | 7.2 | 51,100 | 13.6 | 2.3 | 15,800 | +211 | +222 |
| 125 | .656 | 13.4 | 11.0 | 78,000 | 7.1 | 50,400 | | | | | |
| 135 | .772 | 13.0 | 10.5 | 79,100 | 7.2 | 54,300 | 13.3 | 2.1 | 15,100 | +184 | +208 |
| 150 | .739 | 13.3 | 10.5 | 75,600 | 7.3 | 52,600 | | | | | |
| 160 | .923 | 13.4 | 9.5 | 67,400 | 7.0 | 49,600 | | | | | |
| 180 | 1,173 | 13.3 | 7.7 | 55,400 | 6.4 | 46,000 | 13.3 | .57 | 4,100 | −23 | −26 |
| 200 | 1,956 | 12.6 | 5.6 | 44,940 | 4.7 | 37,720 | | | | | |

(b) Pressure

Figure 2:
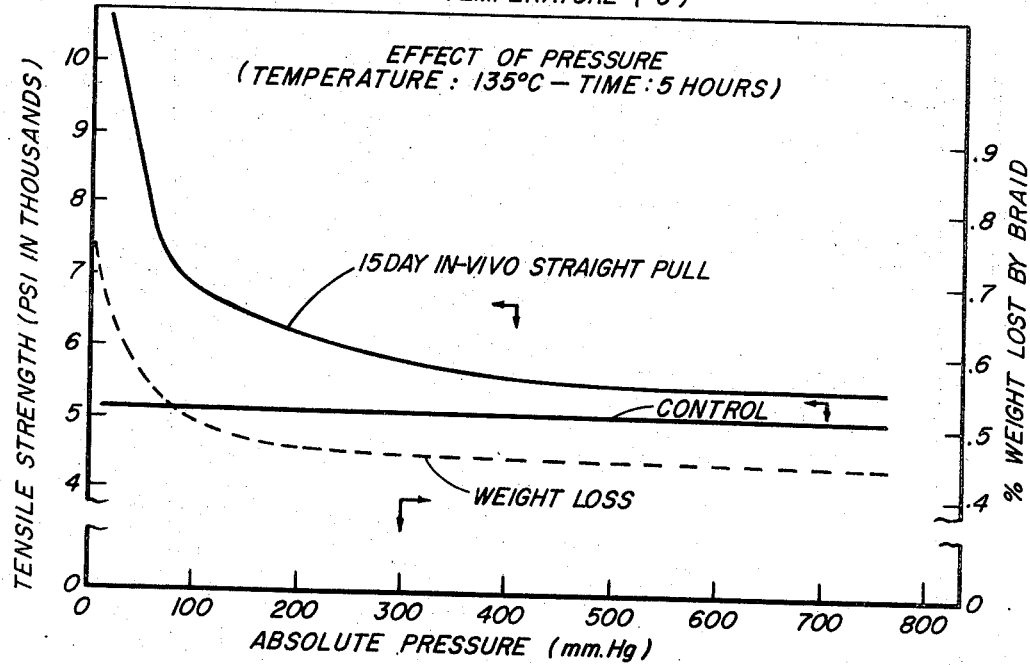
FIG. 2 depicts the effect of the pressure at which a polyfilamentary braid is heated upon the in-vivo strength retention of the braid and the weight loss exhibited by the braid.

Data are presented in Table II which show the effect of pressure (at constant temperature and heating time) upon package and in-vivo properties. The in-vivo and weight loss data of Table II are presented graphically in FIG. 2. These data indicate that the pressure at which the suture is heated has virtually no effect upon the package straight pull and knot pull; however, pressure does have a pronounced effect upon the in-vivo tensile strength of polyglycolic acid. Referring to FIG. 2, it can be seen that it is essential that the suture be heated under conditions of sub-atmospheric pressure. Merely heating at atmospheric pressure, although it does remove some volatiles, has no appreciable effect upon in-vivo strength. This is not surprising since it would not be expected that glycolide or the linear dimer of glycolic acid would be removed in any appreciable amount at such pressures. However, as pressure is gradually reduced below one atmosphere there is a greater increase in the amount of impurities removed from the suture with a corresponding increase in the in-vivo tensile strength of the suture. It is not until pressures below about 300 mm. of mercury are reached that the weight loss and corresponding enhancement of in-vivo tensile strength becomes readily apparent although some weight loss and enhancement of tensile strength does occur at pressures in excess of 300 mm. of mercury but less than one atmosphere. It is, of course, desirable that the pressure be maintained at as low a value as possible; pressures below about 100 mm. of mercury are preferred and pressures of from .1 to 4 mm. of mercury are highly preferred.

Figure 3:
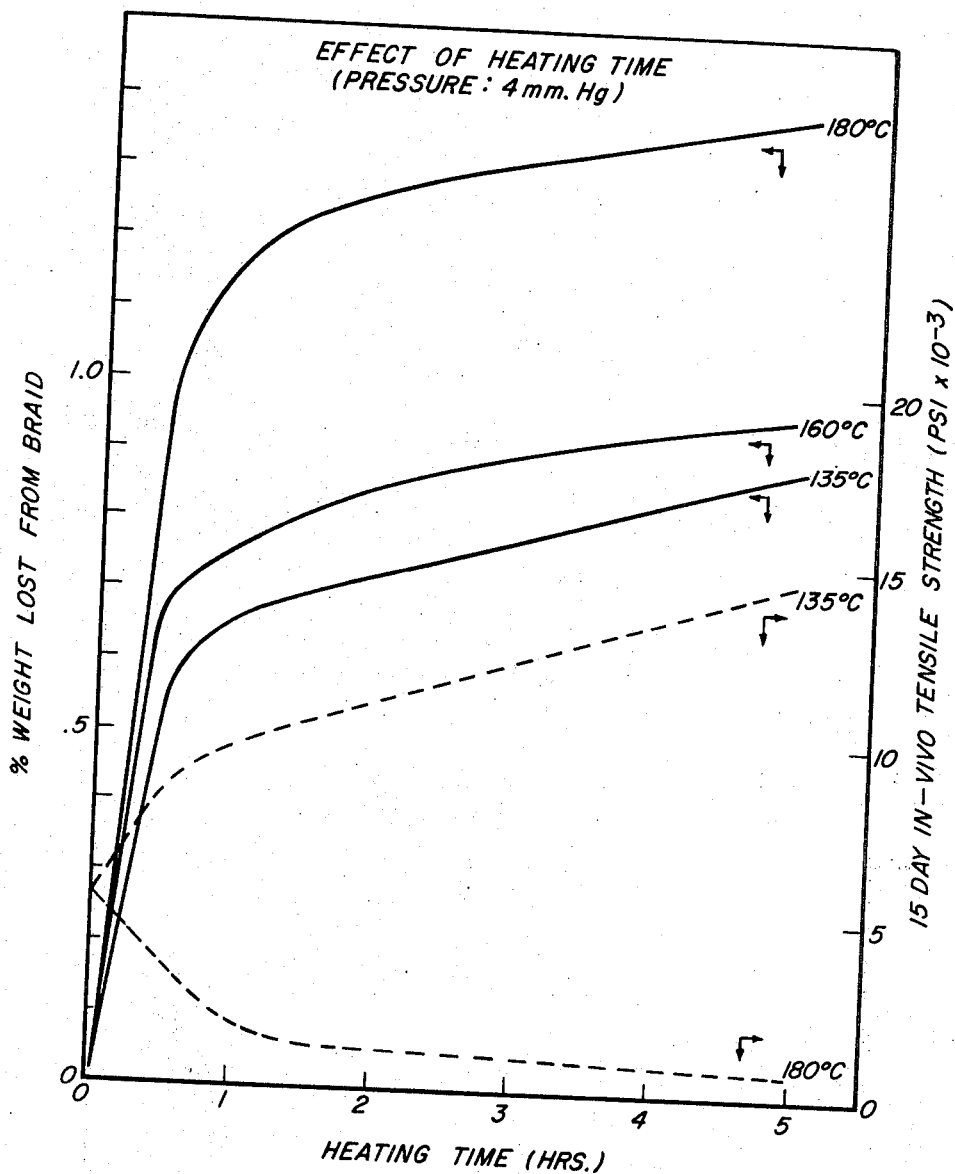
FIG. 3 depicts the effect of heating time upon the in-vivo strength retention of a polyfilamentary braid and the weight loss exhibited by the braid.

The degree to which in-vivo strength of the suture is enhanced appears to roughly parallel the amount of volatiles removed from the suture at least at temperatures within the prescribed temperature range (see the dotted 135° C. curve in FIG. 3). On the other hand, when excessively high temperatures i.e. above 160° C., are used, although there is significant removal of volatiles, there is a marked decrease in the in-vivo strength of the suture as clearly shown by the dotted 180° C. curve of FIG. 3. As discussed above, this is believed to occur at temperatures above 160° C. because the volatiles which are removed are no longer merely the undesirable impurities which are removed at temperatures below 160° C. but are the thermal degradation products of polyglycolic acid as well. The suture can be heated from about 5 minutes to about 24 hours, with the heating time being generally inversely proportional to the temperature at which the suture is heated. Preferred heating times range from about 1 to 5 hours.

In a preferred embodiment, a polyglycolic acid filament, multifilament, braided yarn, or such is heated at a temperature of about 100 to 150° C. for about 3 hours under an absolute pressure of 1 mm. of mercury or less.

TABLE II.—EFFECT OF PRESSURE
(5 hrs. at 135° C.)

| Pressure (mm. Hg) | Percent weight loss | Dia. (mils) | Package properties | | | | 15-day in-vivo properties—straight pull | | | |
|---|---|---|---|---|---|---|---|---|---|---|
| | | | Straight pull | | Knot pull | | | | Percent increase in lb. | Percent increase in p.s.i. |
| | | | Lb. | p.s.i. | Lb. | p.s.i. | Lb. | p.s.i. | | |
| Control | | 15.7 | 14.8 | 76,500 | 9.7 | 50,100 | .98 | 5,100 | | |
| 760 | .44 | 16.1 | 14.7 | 72,200 | 8.9 | 43,700 | 1.1 | 5,400 | +12 | +6 |
| 70 | .516 | 15.8 | 14.7 | 75,000 | 9.0 | 45,900 | 1.4 | 7,100 | +43 | +39 |

(c) Heating time

The effect of heating time (at constant pressure and constant temperature) is shown by the data of Table III. The data of Table III are shown graphically in FIG. 3. Referring to FIG. 3, it can be seen that the amount of volatiles removed from a suture at a fixed heating time depends somewhat on the temperature at which the suture is heated with more volatiles being removed as higher temperatures are used. However, regardless of temperature, the largest portion of vaporizable impurities is removed during the first hour of heating with only minimal additional removal occurring as heating continues.

TABLE III.—EFFECT OF HEATING TIME
(4 mm. Hg and constant temperature)

| Time (hr.) | Templ (° C.) | Percent wt. loss | Package properties | | | | 15-day in-vivo properties—straight pull | | | | |
|---|---|---|---|---|---|---|---|---|---|---|---|
| | | | Dia. (mils) | Straight pull | | Knot pull | | Dia. (mils) | Lb. | P.s.i. | Percent increase in lb. | Percent increase in p.s.i. |
| | | | | Lb. | P.s.i. | Lb. | P.s.i. | | | | | |
| Control | | | 15.7 | 14.8 | 76,500 | 9.7 | 50,100 | 15.7 | .98 | 5,100 | | |
| 0.5 | 135 | .568 | 15.7 | 14.6 | 75,500 | 9.2 | 47,500 | | | M | | |
| 1 | 135 | .659 | 16.1 | 15.8 | 77,600 | 9.4 | 46,200 | 16.0 | 1.5 | 10,700 | +65 | +110 |
| 2 | 135 | .741 | 15.4 | 14.5 | 77,900 | 9.2 | 49,400 | | | | | |
| 3 | 135 | .773 | 15.7 | 14.2 | 73,400 | 9.1 | 47,000 | 15.6 | 2.9 | 15,400 | +195 | +202 |
| 5 | 135 | .881 | 16.1 | 15.7 | 77,100 | 9.1 | 44,700 | 15.5 | 2.0 | 10,800 | +104 | +112 |
| Control | | | | | | | | | | | | |
| 0.5 | 160 | .741 | 13.3 | 11.5 | 82,800 | 7.6 | 54,700 | | | | | |
| 1 | 160 | .734 | 13.2 | 9.6 | 70,200 | 6.6 | 48,200 | | | | | |
| 2 | 160 | .850 | 13.4 | 10.3 | 73,000 | 7.3 | 51,800 | | | | | |
| 3.5 | 160 | .987 | 13.2 | 9.2 | 67,300 | 6.7 | 49,000 | | | | | |
| 5 | 160 | .856 | 13.2 | 10.4 | 76,000 | 7.4 | 54,000 | | | | | |
| Control | | | 16.1 | 16.2 | 79,600 | 9.4 | 46,200 | | .98 | 5,100 | | |
| 0.5 | 180 | .992 | 15.9 | 13.7 | 69,000 | 8.7 | 43,800 | | .59 | 3,400 | | |
| 2 | 180 | 1.22 | 15.9 | 12.1 | 61,000 | 8.9 | 44,800 | | .32 | 1,800 | | |
| 3 | 180 | 1.24 | 16.1 | 12.9 | 63,400 | 9.0 | 44,200 | | | | | |
| 5 | 180 | 1.38 | 15.9 | 11.1 | 55,900 | 7.8 | 39,300 | | .14 | 720 | | |

Figure 4:
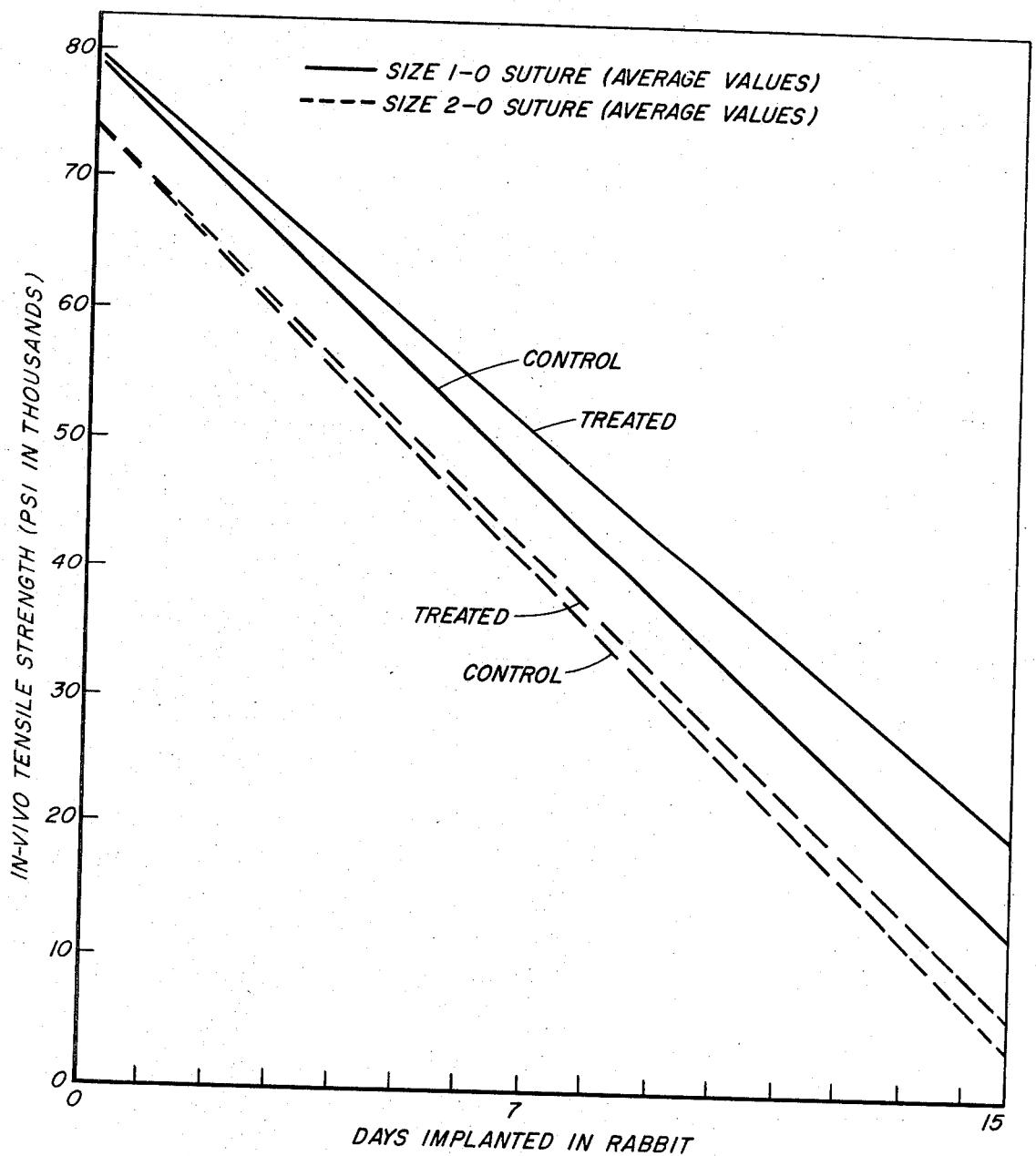
FIG. 4 depicts the enhanced in-vivo strength retention achieved by the process of this invention as shown by a comparison of the in-vivo properties of polyfilamentary braids treated in accord with the process of this invention and braids not so treated.

Table IV presents data which has been gathered on a variety of different sized polyglycolic acid sutures which have been treated in accordance with the process of this invention and serves to indicate the astonishing increases in in-vivo strength retention (as high as 282%) which occur when only small amounts of volatiles are removed from the suture. Selected averaged data from Table IV are shown graphically in FIG. 4.

TABLE IV.—EFFECT UPON PACKAGE AND IN-VIVO PROPERTIES OF POLYGLYCOLIC ACID SUTURES

| Suture size | Dia. (mils) | Package properties—straight pull | | | In-vivo straight pull after 15 day implantation in rabbits | | | Percent wt. loss | Comments |
|---|---|---|---|---|---|---|---|---|---|
| | | Lb. | P.s.i. | Percent change in lb. | Lb. | P.s.i. | Percent change in lb. | | |
| 1 | 18.8 | 20.7 | 74,700 | | 4.3 | 15,500 | | | Control. |
| | 18.9 | 20.1 | 71,600 | −3 | 4.7 | 16,400 | +9 | 0.57 | Treated. |
| 1-0 | 13.4 | 11.4 | 81,000 | | 1.23 | 8,700 | | | Control. |
| | 13.4 | 11.3 | 80,000 | −1 | 2.69 | 19,100 | +1(9 | .41 | Treated. |
| | 13.4 | 11.7 | 83,000 | | .91 | 6,450 | | | Control. |
| | 13.5 | 12.1 | 84,500 | +2 | 3.47 | 21,900 | +282 | .59 | Treated. |
| | 13.5 | 11.2 | 78,300 | | 2.1 | 14,700 | | | Control. |
| | 13.5 | 11.0 | 76,900 | −2 | 3.3 | 22,700 | +57 | .62 | Treated. |
| | 13.0 | 9.0 | 67,800 | | 1.2 | 8,700 | | | Control. |
| | 13.1 | 9.1 | 68,600 | −1 | 1.5 | 10,900 | +25 | .64 | Treatde. |
| | 14.0 | 13.3 | 86,400 | | 2.1 | 13,600 | | | Control. |
| | 13.6 | 12.5 | 86,100 | −6 | 3.2 | 21,100 | +53 | .67 | Treated. |
| | 14.3 | 10.6 | 65,900 | | .20 | 1,200 | | | Control. |
| | 14.4 | 10.3 | 64,000 | −3 | .76 | 4,700 | +260 | .67 | Treated. |
| | 13.5 | 12.7 | 86,800 | | 1.5 | 10,500 | | | Control. |
| | 13.3 | 12.7 | 91,500 | 0 | 3.8 | 27,400 | +164 | .76 | Treated. |
| 2-0 | 10.5 | 7.15 | 82,300 | | 1.2 | 13,900 | | | Control. |
| | 10.7 | 6.8 | 75,200 | −5 | 1.3 | 14,500 | +8 | .45 | Treated. |
| | 11.7 | 7.8 | 73,600 | | .38 | 3,500 | | | Control. |
| | 11.9 | 7.3 | 65,900 | −6 | .76 | 7,600 | +105 | .54 | Treated. |
| | 10.3 | 6.4 | 76,400 | | .55 | 6,600 | | | Control. |
| | 10.2 | 6.5 | 79,600 | +2 | 1.03 | 12,600 | +87 | .84 | Treated. |
| | 10.4 | 6.1 | 71,800 | | .44 | 5,200 | | | Control. |
| | 10.1 | 5.9 | 73,700 | −3 | .99 | 12,400 | +125 | 1.04 | Treated. |
| 3-0 | 9.9 | 6.4 | 83,200 | | .69 | 8,970 | | | Control. |
| | 10.1 | 6.8 | 84,900 | +6 | 1.70 | 21,200 | +147 | .85 | Treated. |

NOTES:
Control: As is.
Treated: Subjected to 135° C. and 4 mm. Hg for about 5 hours.

Figure 5:
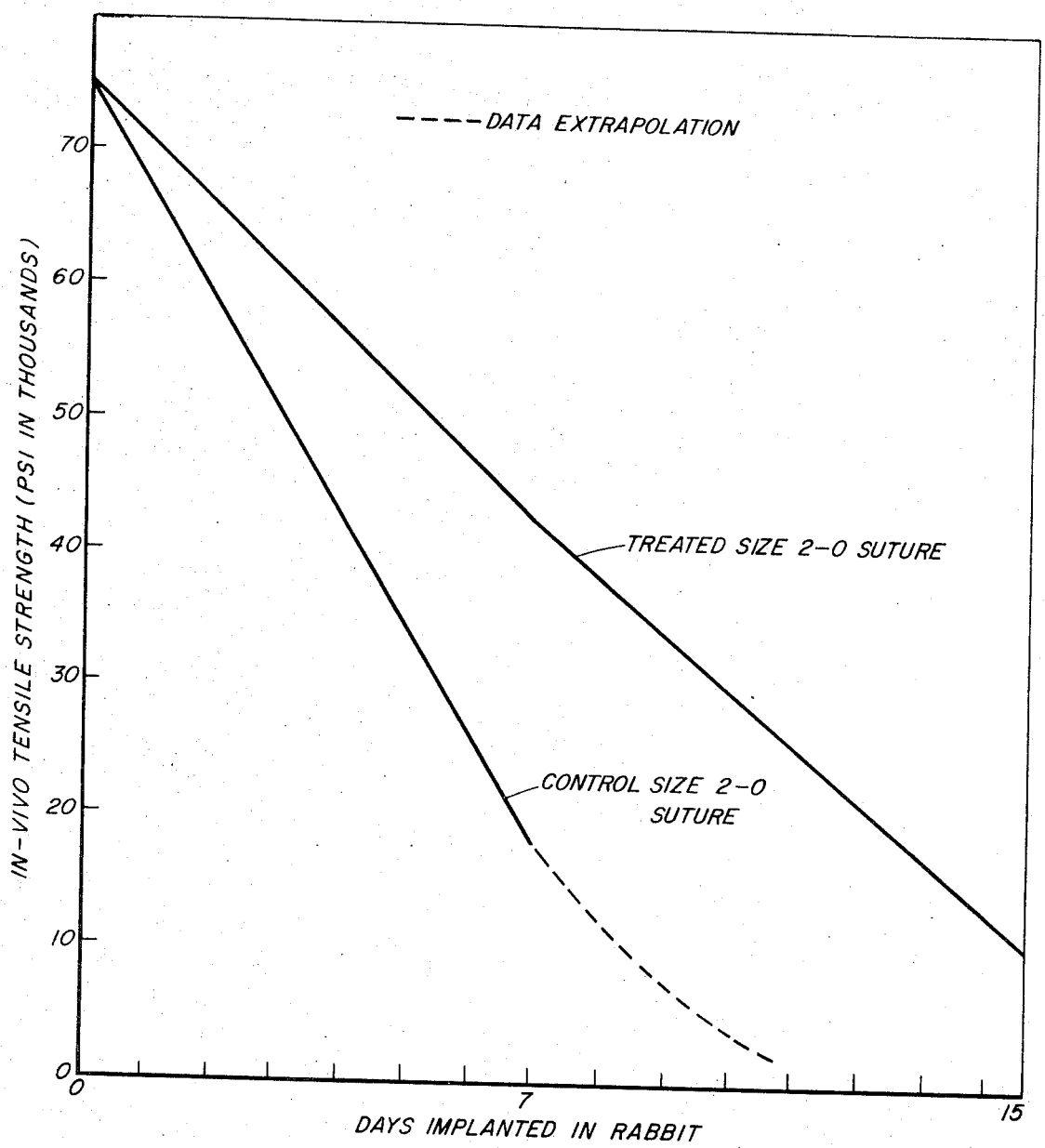
FIG. 5 depicts the significant upgrading in in-vivo strength retention which can be achieved by the process of this invention by comparing the in-vivo properties of polyfilamentary braids which ordinarily have little, if any, in-vivo tensile strength after 15 days implantation in living tissue with the in-vivo properties observed on the same braids after treatment in accordance with the process of this invention.

Table V presents data which indicate how polyglycolic acid sutures formerly having little, if any, tensile strength after 15 days implantation in living tissue were upgraded by treatment in accordance with the process of this invention to sutures not only having acceptable 15 day tensile strengths but also having surprisingly high 15 day values. For example, in one case, a suture which prior to treatment by the process of this invention had virtually no 15 day tensile strength exhibited a tensile strength of 17,438 p.s.i. after treatment by the process by this invention. Selected average data from Table V are shown graphically in FIG. 5.

The devolatilized sutures prepared in accordance with this invention can be dyed, coated, needled, sterilized, packaged, and used in accordance with techniques described for the polyglycolic acid suture disclosed in U.S. Pat. 3,297,033.

Figure 6A:
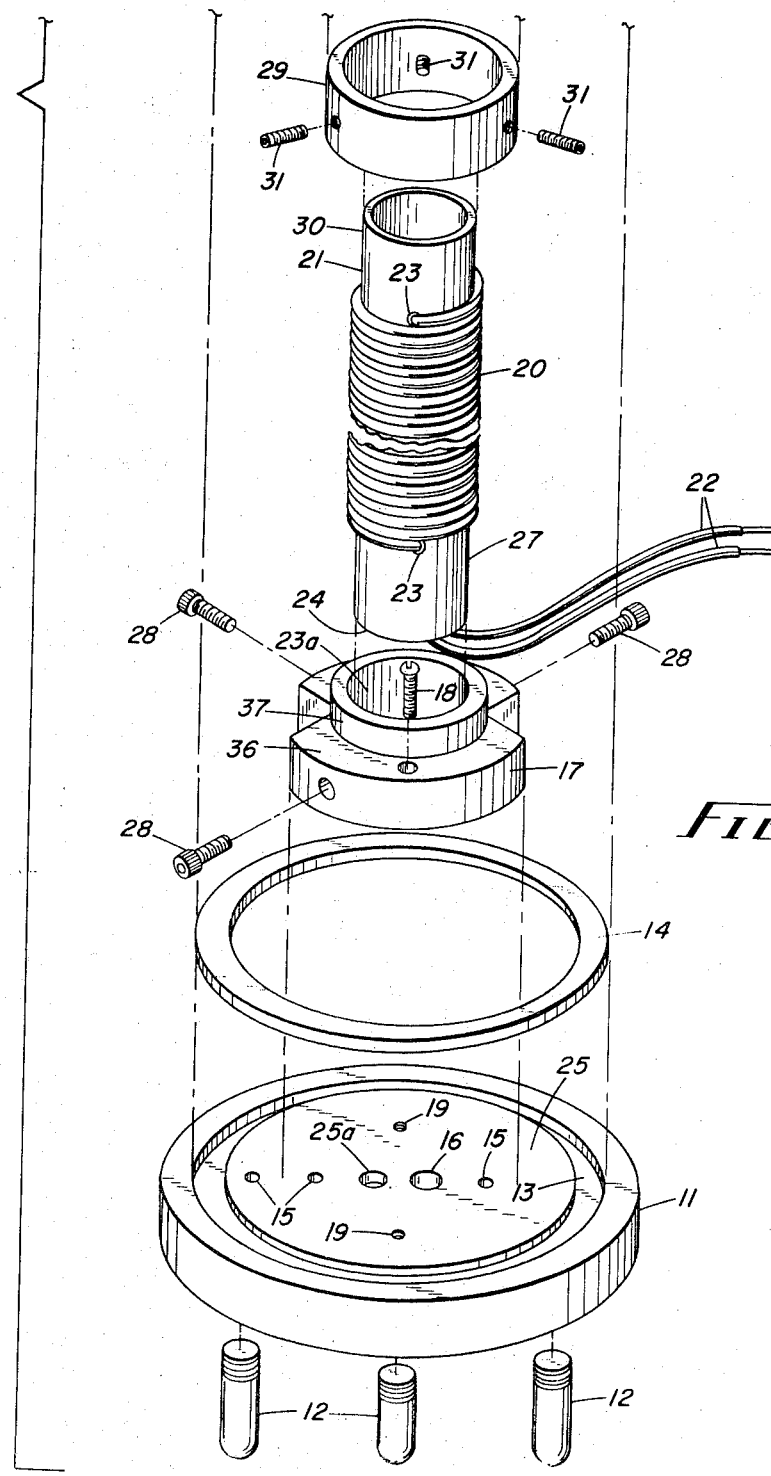
FIGS. 6a and 6b represent an exploded view of an apparatus which is suitable for preparing the shaped polyglycolic acid of this invention.
Figure 6B:
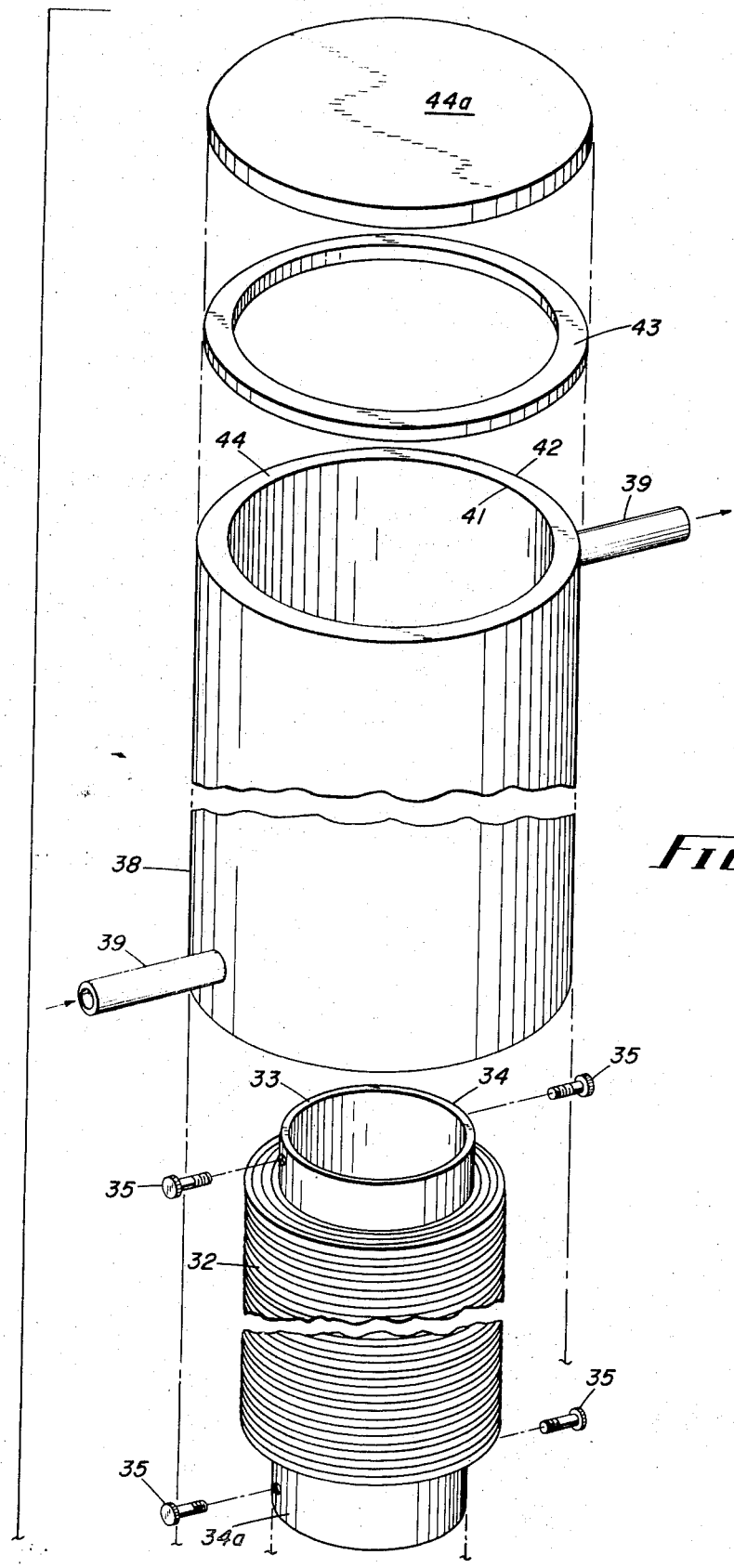

Referring to FIGS. 6a and 6b, and to FIG. 7, a center sectional view of the assembled apparatus, this apparatus comprises metallic base plate 11 supported by legs 12. Base plate 11 contains groove 13 which is adapted to receive gasket 14. Base plate 11 contains threaded apertures 15 which are adapted for insertion of thermocouples up through plate 11 into the apparatus (see FIG. 7). Base plate 11 also contains threaded aperture 16 adapted for connection to a vacuum system (see FIG. 7). Gasket 14 is placed within groove 13.

Support plate 17 is placed upon base plate 11 and firmly attached thereto by screws 18 which are threaded into holes 19 in base plate 11.

High resistance wire 20 is wrapped around hollow metallic cylinder 21 to provide a heating element. Leads 22 of wire 20 pass through apertures 23 in the wall of cylinder 21 and into the interior of cylinder 21. Cylinder TABLE V.—UPGRADING OF POLYGLYCOLIC ACID SUTURE BY APPLICATION OF DEVOLATILIZATION TREATMENT THERETO

| Suture size | Dia. (mils) | Package properties | | | In-vivo straight pull after implantation in rabbits for— | | | | | | Percent wt. loss | Comments |
|---|---|---|---|---|---|---|---|---|---|---|---|---|
| | | | | | 7 days | | | 15 days | | | | |
| | | Lb. | P.s.i. | Percent change in lb. | Lb. | P.s.i. | Percent change in lb. | Lb. | P.s.i. | | | |
| 1 | 18.6 | 15.0 | 55,230 | | .89 | 3,275 | | 0 | 0 | | | Control. |
| | 18.6 | 14.4 | 52,700 | −4 | 8.8 | 32,270 | +880 | .74 | 2,700 | | 1.3-2.5 | Treated. |
| 1-0 | 13.2 | 8.75 | 63,600 | | 1.31 | 9,500 | | 0 | 0 | | | Control. |
| | 13.2 | | | | 5.4 | 39,200 | +310 | 1.08 | 7,900 | | 1.3-2.5 | Treated. |
| 2-0 | 10.8 | 7.5 | 80,200 | | | | | 0 | 0 | | | Control. |
| | 11.0 | 7.8 | 81,500 | +4 | | | | 1.03 | 10,400 | | .87 | Treated. |
| | 10.5 | 7.14 | 82,100 | | 1.61 | 18,500 | | 0 | 0 | | | Control. |
| | 10.5 | | | | 4.78 | 55,000 | +197 | 1.52 | 17,438 | | 1.3-2.5 | Treated. |
| | 10.6 | 6.2 | 70,300 | | .54 | 6,100 | | 0 | 0 | | | Control. |
| | 10.6 | | | | 2.67 | 30,300 | +395 | .025 | 280 | | 1.3-2.5 | Treated. |
| | 10.2 | 5.46 | 66,700 | | 2.81 | 34,300 | | 0 | 0 | | | Control. |
| | 10.2 | | | | 2.60 | 31,800 | −7 | .39 | 4,770 | | 1.3-2.5 | Treated. |
| | 10.0 | 6.3 | 80,300 | | 1.0 | 12,700 | | 0 | 0 | | | Control. |
| | 10.1 | | | | 4.02 | 51,200 | +302 | .945 | 12,000 | | 1.3-2.5 | Treated. |

Apparatus

FIGS. 6a and 6b represent exploded views of a preferred embodiment of an apparatus which is particularly suitable for removing and collecting vaporizable impurities from a polyglycolic acid filament in accordance with the process of this invention. The exploded view of the apparatus is best seen by placing FIG. 6b on top of FIG. 6a to obtain an overall exploded view of the apparatus.

21 containing wire 20 is then inserted through recess 23a of plate 17, the bottom surface 24 of cylinder 21 coming to rest on surface 25 of base plate 11. Lead wires 22 emerge from the apparatus through aperture 25a in plate 11 connecting to variable rheostat 26 (see FIG. 7). Aperture 25a is adapted for air-tight passage of leads 22 into and out of the apparatus such as by a Stupekof tube. Plate 17 is secured about base 27 of cylinder 21 by set screws 28. Spacing collar 29 is then inserted over the top portion 30 of cylinder 21 by set screws 31.

Polyglycolic acid suture braid 32 is circumferentially wrapped around hollow metallic cylinder 33. Cylinder 33 is adapted at top portion 34 and bottom portion 34a to receive screws 35 which facilitate subsequent removal of the cylinder (while still hot) from the apparatus by means of a wire handle. Cylinder 33 containing braid 32 is carefully slid over collar 29 and cylinder 21 coming to rest on surface 36 of support plate 17. Collar 37 of support plate 17 and collar 29 insure that the inner surface of column 33 is uniformly spaced in distance from the outer surface of wires 20 so as to provide uniform heating of braid 32.

Hollow cylinder 38 which is adapted 39 for passage of a liquid cooling medium through annular space 40 (see FIG. 7) between inner wall 41 and outer wall 42 is then slid over cylinder 33 and braid 32 contained thereon coming to rest on gasket 14 which is mounted in groove 13 of plate 11. Gasket 43 is placed on the top surface 44 of cylinder 38, and lid 44a is placed on top of gasket 43 to complete assembly of the apparatus.

Referring to FIGS. 6a, 6b, and 7, it will be noted that the apparatus contains provisions for the insertions of three thermocouples by means of apertures 15. One thermocouple 45 measures temperature on the outside surface 46 of circumferentially wrapped braid 32. A second thermocouple 47 measures temperature of the inner surface 48 of cylinder 33. A third thermocouple 49 measures the temperature of wire 20. These three thermocouples are connected to temperature recorder 50 for easy monitoring.

The temperature of wire 20 can be adjusted to produce the desired temperature at inside wall 48 and the surface 46 of braid 32. The temperature of wire 20 required to produce any given temperature at surface 46 of braid 32 will of course vary depending on the thickness of air gap 51 between cylinders 27 and 33 as well as on the thickness of wall 52 of cylinder 33. Generally, where the width of gap 51 is about one inch and where the thickness of wall 52 is about ⅛ of an inch, the temperature of wire 20 can vary from about 210 to 290° C., corresponding to an inner wall 48 temperature of from about 145 to 205° C. and to a temperature at the outer surface 53 of wall 52 of from about 100 to about 160° C.

After the apparatus is assembled the appropriate vacuum is applied through aperture 16 and power is applied to wire 20, said power being adjusted by rheostat 26 to create the aforementioned desired temperature at the various points in the apparatus. After a brief induction period, the temperature of braid 32 is raised to a sufficiently high value to cause the vaporization of any vaporizable impurities contained therein. Cooling water having been previously applied to annular space 40 of cylinder 38, the vaporized impurities from braid 32 diffuse across gap 54 which separates heated braid 32 from cooled inner surface 55 of cylinder 38 contacting cooled surface 55 and condensing thereon whereby their removal from the environment surrounding braid 32 is effected.

The thickness of gap 54 can vary considerably provided there is a finite distance between outer surface 46 of braid 32 and surface 55 of cylinder 38. Ordinarily, a gap distance of up to about 12 inches is suitable with a distance of about 1 to 2 inches higher preferred.

If the radial thickness of braid 32 becomes excessive, the temperature of braid 32 in contact with surface 53 may have to be in excess of 160° C. in order to insure a suitably high temperature at the surface 46 of braid 32 which is closest to cooled surface 55, thereby creating a risk of damaging braid closest to hot surface 53 of wall 52. However, when thicknesses of less than ½ inch are used in the described apparatus, suitable temperatures can be produced throughout the entire radial thickness of braid 32. The acceptable radial braid thickness will, of course, depend on the particular design of the apparatus.

Table VI presents data gathered using the apparatus described in FIGS. 6a, 6b, and 7. In all cases, there was improvement in the in-vivo strength retention of the sutures treated on the apparatus as compared to untreated sutures. It should be noted that although samples were taken from various radial thicknesses of braid 32, in-vivo strength improvement was noted in all cases. The data of Table VI also indicate that there is substantially no difference in package straight pull and knot pull between treated and untreated sutures.

TABLE VI.—POLYGLYCOLIC ACID SUTURES OF ENHANCED IN-VIVO STRENGTH RETENTION PREPARED WITH THE APPARATUS OF FIGURES 6a, 6b, AND 7

| Braid length (ft.) | Temperature (° C.) of— | | | Heating element | Location of sample [1] | Package properties | | | | | 15 day in-vivo properties—Straight pull | |
|---|---|---|---|---|---|---|---|---|---|---|---|---|
| | Outside braid | Outer wall of braid cylinder | Inner wall of braid cylinder | | | Dia. (mils) | Straight pull | | Knot pull | | | |
| | | | | | | | Lb. | P.s.i. | Lb. | P.s.i. | Lb. | P.s.i. |
| | | | | | | [3] 10.3 | [3] 5.5 | [3] 66,000 | [3] 3.6 | [3] 43,200 | [3] 0 | [3] 0 |
| 5,700 | 100 | 113 | 147 | 213 | 1 | 9.7 | 5.4 | 73,100 | 3.7 | 50,100 | .29 | 4,000 |
| 5,700 | 100 | 113 | 147 | 213 | 2 | 9.9 | 5.2 | 67,600 | 3.8 | 49,400 | .25 | 3,300 |
| 5,700 | 100 | 113 | 147 | 213 | 3 | 9.8 | 5.0 | 66,300 | 3.6 | 47,700 | .11 | 1,500 |
| 5,700 | 127 | 160 | 200 | 280 | 1 | 10.3 | 5.4 | 64,800 | 3.8 | 45,600 | .13 | 1,600 |
| 5,700 | 127 | 160 | 200 | 280 | 2 | 10.4 | 5.3 | 62,400 | 4.1 | 48,200 | .14 | 1,600 |
| 5,700 | 127 | 160 | 200 | 280 | 3 | 10.5 | 4.9 | 56,600 | 3.7 | 42,800 | .12 | 1,400 |
| 8,400 | 101 | 114 | 148 | 215 | 1 | 10.1 | 6.4 | 79,900 | 4.4 | 54,900 | .014 | 170 |
| 8,400 | 101 | 114 | 148 | 215 | 2 | 10.4 | 6.1 | 71,800 | 3.7 | 43,600 | .71 | 8,400 |
| 8,400 | 101 | 114 | 148 | 215 | 3 | 10.3 | 6.6 | 79,200 | 4.6 | 55,200 | .71 | 8,500 |
| 8,400 | 128 | 162 | 202 | 283 | 1 | 10.2 | 5.3 | 64,900 | 4.0 | 49,000 | .01 | 120 |
| 8,400 | 128 | 162 | 202 | 283 | 2 | 9.5 | 4.4 | 62,100 | 3.4 | 50,800 | .03 | 420 |
| 8,400 | 128 | 162 | 202 | 283 | 3 | 10.1 | 5.6 | 69,900 | 4.3 | 53,700 | .25 | 3,100 |

[1] See the following—
Sample location 1=Braid in contact with the outer wall of the braid cylinder.
Sample location 2=Braid midway between Location 1 and the outside wind of the braid.
Sample location 3=Braid from the outside wind of the braid, i.e. the braid farthest removed from the outer wall of the braid cylinder.
[3] Control.

We claim:

1. A method for improving the in-vivo strength retention of absorbable polyglycolic acid in shaped form which comprises heating polyglycolic acid in shaped form, which contains vaporizable impurities, in a substantally dry environment at a temperature of from about 100° C. to about 150° C. for a period of time, varying inversely with temperature, of between about 1 hour and 5 hours, at an absolute pressure between about 0.1 mm. and 4 mm. of mercury to vaporize therefrom an effective amount of said impurities and removing said vaporized impurities from said polyglycolic acid.

2. The method of claim 1 wherein said impurities are removed from the environment of the polyglycolic acid by providing a cooling surface maintained at a temperature below about 70° C., said surface separated from said polyglycolic acid by a distance of up to about 12 inches whereby said vaporized impurities are collected as a residue on said cooled surface.

3. The method of claim 1 wherein the polyglycolic acid is heated at about 135° C. and for about 3 hours at an absolute pressure of about 4 millimeters of mercury and where the distance between the heated polyglycolic acid and the cooling surface is about 2 inches.

4. The method of claim 1 wherein the polyglycolic acid in shaped form comprises one or more filaments of polyglycolic acid.

References Cited

UNITED STATES PATENTS

| | | | |
|---|---|---|---|
| 3,239,490 | 3/1966 | Gee et al. | 260—78 L |
| 2,668,162 | 2/1954 | Lowe | 260—78.3 R |
| 3,597,450 | 8/1971 | Schmitt et al. | 260—78.3 R |
| 3,422,181 | 1/1969 | Chirgwin, Jr. | 260—78.3 R |
| 3,452,126 | 6/1969 | Sieron | 264—236 |

ROBERT F. WHITE, Primary Examiner

G. AUVILLE, Assistant Examiner

U.S. Cl. X.R.

128—335.5; 260—78.3 R; 264—345

UNITED STATES PATENT OFFICE
CERTIFICATE OF CORRECTION

Patent No. 3,772,420    Dated November 13, 1973

Inventor(s) Arthur Glick and James B. McPherson, Jr.

It is certified that error appears in the above-identified patent and that said Letters Patent are hereby corrected as shown below:

Col. 6 line 73.   Delete the following words: "is heated has virtually no effect upon the package straight".

Col. 6 line 74.   After the word "suture" insert the following: --is heated has virtually no effect upon the package straight--.

Col. 7 Table II.  Last line in Table II has been omitted. Please insert the following numbers under their respective headings:

Under Pressure (mm.Hg.) insert -- 25-30 --.
　　　　　Under % Weight Loss insert -- .616 --.
　　　　　Under Dia.(mils) insert -- 16.0 --.
　　　　　Under Straight Pull Lb. insert -- 15.5 --.
　　　　　Under Straight Pull PSI insert -- 77.100 --.
　　　　　Under Knot Pull Lb. insert -- 10.2 --.
　　　　　Under Knot Pull PSI insert -- 50,700 --.
　　　　　Unded 15-Day In-vivo Properties Straight Pull
　　　　　sub-heading Lb. insert -- 2.2 --;
　　　　　sub-heading PSI insert -- 10,900 --;
　　　　　sub-heading %Increase in Lb. insert -- +125 --;
　　　　　sub-heading %Increase in PSI insert -- +114 --.

Col 9 Table IV.   Under Package properties - straight pull sub-heading P.s.i. line 15, delete "86,800" and insert in its place --88,800--.

Under In-vivo straight pull after 15 day implantation in rabbits sub-heading Lb. line 20 delete ".76" and in its place insert --.78--;sub-heading P.s.i. line 20 delete "7,600" and in its place insert --7,000--; sub-heading Percent change in

FORM PO-1050 (10-69)

UNITED STATES PATENT OFFICE   PAGE 2
CERTIFICATE OF CORRECTION

Patent No. 3,772,420          Dated November 13, 1973

Inventor(s) Arthur Glick and James B. McPherson, Jr.

It is certified that error appears in the above-identified patent and that said Letters Patent are hereby corrected as shown below:

1b. line 4 delete "+1(9" and insert in its place --+119--; same sub-heading line 14 delete "+260" and insert in its place -- +280 --.

Signed and sealed this 14th day of May 1974.

(SEAL)
Attest:

EDWARD M. FLETCHER, JR.         C. MARSHALL DANN
Attesting Officer                  Commissioner of Patents